(12) United States Patent
Gupta et al.

(10) Patent No.: US 10,581,969 B2
(45) Date of Patent: Mar. 3, 2020

(54) STORAGE SYSTEM USING CLOUD BASED RANKS AS REPLICA STORAGE

(71) Applicant: International Business Machines Corporation, Armonk, NY (US)

(72) Inventors: Lokesh Gupta, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/704,684

(22) Filed: Sep. 14, 2017

(65) Prior Publication Data

US 2019/0082009 A1 Mar. 14, 2019

(51) Int. Cl.
*G06F 15/173* (2006.01)
*H04L 29/08* (2006.01)
(Continued)

(52) U.S. Cl.
CPC ........ *H04L 67/1097* (2013.01); *G06F 12/109* (2013.01); *H04L 41/5022* (2013.01);
(Continued)

(58) Field of Classification Search
CPC ................................................. H04L 67/1097; H04L 41/5022; G06F 12/109
(Continued)

(56) References Cited

U.S. PATENT DOCUMENTS 6,269,431 B1 * 7/2001 Dunham ............. G06F 11/1469
707/999.202
6,996,741 B1 2/2006 Pittelkow
(Continued)

FOREIGN PATENT DOCUMENTS

| CN | 101719106 A | 6/2010 |
|---|---|---|
| CN | 102467408 A | 5/2012 |

(Continued)

OTHER PUBLICATIONS

Anonymous, "Smarter Method to Achieve Multi-tenancy at the RAID Level", An IP.com Prior Art Database Technical Disclosure. IP.com No. IPCOM000204434D, Feb. 24, 2011. 6 pages.
(Continued)

*Primary Examiner* — Duyen M Doan
(74) *Attorney, Agent, or Firm* — Jay Wahlquist

(57) ABSTRACT

A computer-implemented method for using cloud based ranks as replica storage comprises allocating storage space on cloud storage devices via a cloud interface; mapping the allocated storage space on the cloud storage devices to corresponding virtual local addresses; grouping the virtual local addresses to create at least one cloud based rank from the allocated storage space on the cloud storage devices; designating a cloud based rank as cloud based replica storage for a corresponding primary storage; assigning a service level to the cloud based replica storage based, at least in part, on characteristics of data being mirrored to the cloud based replica storage and a rate at which the data is mirrored to the cloud based replica storage; and dynamically adjusting the service level assigned to the cloud based replica storage in response to a command to swap the cloud based replica storage with the corresponding primary storage.

25 Claims, 5 Drawing Sheets

(51) Int. Cl.
  *G06F 12/109* (2016.01)
  *H04L 12/26* (2006.01)
  *H04L 12/24* (2006.01)

(52) U.S. Cl.
  CPC .......... *H04L 43/16* (2013.01); *H04L 67/1095* (2013.01); *G06F 2212/657* (2013.01)

(58) Field of Classification Search
  USPC .................................................. 709/223, 226
  See application file for complete search history.

(56) References Cited

U.S. PATENT DOCUMENTS

| | | | |
|---|---|---|---|
| 7,028,158 | B1 | 4/2006 | Beatty |
| 7,225,211 | B1 | 5/2007 | Colgrove |
| 8,370,312 | B1 | 2/2013 | Sawhney |
| 8,484,416 | B2 | 7/2013 | Smith |
| 8,612,284 | B1* | 12/2013 | Sharif ............... G06F 3/067 705/400 |
| 8,745,327 | B1 | 6/2014 | Throop et al. |
| 8,972,778 | B2* | 3/2015 | Kulkarni ............ G06F 11/2094 714/6.22 |
| 9,021,204 | B1 | 4/2015 | Awasthi |
| 9,128,948 | B1 | 9/2015 | Raorane |
| 9,210,100 | B2 | 12/2015 | Van Der Linden |
| 9,268,493 | B2 | 2/2016 | Kamalavannan |
| 9,378,093 | B2 | 6/2016 | Cooper et al. |
| 9,411,539 | B2 | 8/2016 | Chiu et al. |
| 9,432,298 | B1 | 8/2016 | Smith |
| 9,454,473 | B2 | 9/2016 | Luan et al. |
| 9,552,248 | B2 | 1/2017 | Miller |
| 9,632,707 | B2 | 4/2017 | Hyde, II et al. |
| 9,646,010 | B2 | 5/2017 | Mokhtarzada |
| 9,665,303 | B1 | 5/2017 | Huff et al. |
| 9,749,193 | B1* | 8/2017 | Rokicki ............... H04L 63/20 |
| 10,237,343 | B1* | 3/2019 | Wigmore ........... H04L 67/1097 |
| 2008/0154776 | A1 | 6/2008 | Xia |
| 2008/0201523 | A1 | 8/2008 | Ash |
| 2010/0042720 | A1 | 2/2010 | Stienhans |
| 2010/0131324 | A1* | 5/2010 | Ferris .................. G06Q 10/06 705/7.12 |
| 2010/0161759 | A1 | 6/2010 | Brand |
| 2010/0333116 | A1 | 12/2010 | Prahlad et al. |
| 2011/0022812 | A1 | 1/2011 | Van Der Linden |
| 2011/0271067 | A1 | 11/2011 | Chou |
| 2012/0016838 | A1 | 1/2012 | Arai |
| 2012/0047107 | A1 | 2/2012 | Doddavula |
| 2012/0246310 | A1 | 9/2012 | Broda |
| 2013/0159637 | A1 | 6/2013 | Forgette |
| 2013/0212345 | A1 | 8/2013 | Nakajima |
| 2013/0218919 | A1 | 8/2013 | Solonchev |
| 2013/0332700 | A1 | 12/2013 | Kopylovitz |
| 2014/0052864 | A1 | 2/2014 | Van Der Linden |
| 2014/0223576 | A1 | 8/2014 | Zhao |
| 2014/0280387 | A1 | 9/2014 | Lin |
| 2014/0337576 | A1 | 11/2014 | Burton |
| 2015/0112944 | A1* | 4/2015 | Wu ...................... G06F 11/2097 707/652 |
| 2015/0227468 | A1 | 8/2015 | Berger |
| 2016/0004481 | A1 | 1/2016 | Lakshman |
| 2016/0048532 | A1 | 2/2016 | Islam et al. |
| 2016/0139835 | A1 | 5/2016 | Fiebrich-Kandler |
| 2016/0162438 | A1 | 6/2016 | Hussain |
| 2016/0197834 | A1 | 7/2016 | Luft |
| 2016/0314079 | A1 | 10/2016 | Medovich |
| 2016/0378518 | A1 | 12/2016 | Antony et al. |
| 2017/0013057 | A1* | 1/2017 | Shani ................... G06F 3/0619 |
| 2017/0039218 | A1 | 2/2017 | Prahlad et al. |
| 2017/0277435 | A1* | 9/2017 | Wadhwa .............. G06F 3/0605 |
| 2018/0024853 | A1 | 1/2018 | Warfield |
| 2018/0113734 | A1 | 4/2018 | Yamato |
| 2019/0095458 | A1 | 3/2019 | Saradhi |
| 2019/0179805 | A1 | 6/2019 | Prahlad |

FOREIGN PATENT DOCUMENTS

| | | |
|---|---|---|
| CN | 104820575 A | 8/2015 |
| CN | 105827669 A | 8/2016 |

OTHER PUBLICATIONS

Anonymous, "Define virtual storage pool attributes based on storage volumes to be migrated", An IP.com Prior Art Database Technical Disclosure. IP.com No. IPCOM000234650D, Jan. 24, 2014. 7 pages.

Anonymous, "Data Migration and I/O Throttling to Reduce Temperature Hot Spots in a storage controller", An IP.com Prior Art Database Technical Disclosure. IP.com No. IPCOM000208028D. Jun. 20, 2011. 4 pages.

Unknown, "Cloud-integrated Storage—What & Why", Microsoft, Mar. 2013. 10 pages.

Anonymous, "Policy-driven method and system to automate the provisioning of shared storage space in a cloud environment", An IP.com Prior Art Database Technical Disclosure. IP.com No. IPCOM000220017D, Jul. 18, 2012. 5 pages.

Anonymous, "Method and System for Pre-Allocating Virtual Disks in a Cloud Environment", An IP.com Prior Art Database Technical Disclosure. IP.com No. IPCOM000220121D, Jul. 23, 2012. 3 pages.

Anonymous, "Smart Device Cloud", An IP.com Prior Art Database Technical Disclosure. IP.com No. IPCOM000206936D, May 13, 2011. 15 pages.

IBM, "Rules Based Storage Cloud", An IP.com Prior Art Database Technical Disclosure. IP.com No. IPCOM000181667D, Apr. 8, 2009. 3 pages.

Anonymous, "System and method for enhancing high data rate mobile application performance by tiering between multiple storage cards", An IP.com Prior Art Database Technical Disclosure. IP.com No. IPCOM000245740D, Apr. 4, 2016. 10 pages.

Anonymous, "Optimize data migration in a system which mixes local storage devices and Cloud Storage", An IP.com Prior Art Database Technical Disclosure. IP.com No. IPCOM000238089D, Aug. 1, 2014. 4 pages.

Anonymous, "A system and method to create a cost efficient mobility solution of storing data in public clouds", An IP.com Prior Art Database Technical Disclosure. IP.com No. IPCOM000232553D, Nov. 15, 2013. 10 pages.

Anonymous, "Dynamic Model for Storage in a Cloud Environment With Quality of Service Feature", An IP.com Prior Art Database Technical Disclosure. IP.com No. IPCOM000209739D, Aug. 12, 2011. 5 pages.

Unknown, "Cohesity Cloud Integration Solution Overview and Value Proposition", COHESITY, 2016. 2 pages.

List of Patents or Patent Applications Treated as Related, Sep. 12, 2017. 2 pages.

Gupta et al., "Storage System Using Cloud Storage as a Rank", U.S. Appl. No. 15/074,648, filed Sep. 14, 2017.

Gupta et al., "Thin Provisioning Using Cloud Based Ranks", U.S. Appl. No. 15/704,712, filed Sep. 14, 2017.

Gupta et al., "Dynamic Data Relocation Using Cloud Based Ranks", U.S. Appl. No. 15/704,775, filed Sep. 14, 2017.

Mell et al., "The NIST Definition of Cloud Computing", National Institute of Standards and Technology, Special Publication 800-145, Sep. 2011. 7 pages.

Westphal et al., "IBM System Storage DS8000 Architecture and Implementation", IBM Redbooks, International Technical Support Organization, Nov. 2012. www.redbooks.ibm.com/redbooks/pdfs/sg248886.pdf 534 pages.

Unknown, "IBM Easy Tier", IBM, Jun. 5, 2015. https://www.ibm.com/support/knowledgecenter/en/HW213_7.3.0/com.ibm.storage.ssic.help.doc/f2c_autodatareloc_lfa4gd.html 4 pages.

Unknown, "Overview of IBM Cloud Manager with OpenStack", IBM, 2015. https://www.ibm.com/support/knowledgecenter/en/SST55W_4.3.0/liaca/liaca_overview.html 1 page.

Unknown, "HyperSwap function", IBM, 2016. https://www.ibm.com/support/knowledgecenter/en/STVLF4_7.7.1/spectrum.virtualize.771.doc/svc_hyperswapovr.html 1 page.

(56) References Cited

OTHER PUBLICATIONS

Unknown, "Types of Data Replication", IBM, Copyright 2002, 2009. https://www.ibm.com/support/knowledgecenter/en/SSSKXG_1.4.0.1/com.ibm.sspc_v1401.doc/frg_c_sspc_ct.html 10 pages.

Dufrasne et al., "IBM DS8000 Easy Tier", IBM Redbooks, International Technical Support Organization, Aug. 2016. http://www.redbooks.ibm.com/abstracts/redp4667.html 166 pages.

Unknown, "Amazon S3 Reduced Redundancy Storage", Amazon, 2017. https://aws.amazon.com/s3/reduced-redundancy/ last accessed Aug. 24, 2017. 7 pages.

Unknown, "Amazon S3", Amazon, 2017. https://aws.amazon.com/s3/, last accessed Aug. 24, 2017. 9 pages.

Unknown, "Amazon S3 Storage Classes", https://aws.amazon.com/s3/storage-classes/ last accessed Aug. 24, 2017. 7 pages.

Unknown, "Disk Storage DS8000 Overview", Lascon Storage, http://www.lascon.co.uk/hwd-ds8k-overview.php last accessed Aug. 24, 2017. 6 pages.

International Search Report and Written Opinion for International Application No. PCT/IB2018/056279, filed Aug. 20, 2018.

International Search Report and Written Opinion for International Application No. PCT/IB2018/056795, filed Sep. 3, 2018.

Ruiu et al., "Automatic Dynamic Allocation of Cloud Storage for Scientific Applications," 2015 Ninth International Conference on Complex, Intelligent, and Software Intensive Systems, Aug. 13, 2015, pp. 209-216.

International Search Report and Written Opinion for International Application No. PCT/IB2018/056280 filed Aug. 20, 2018.

\* cited by examiner

STORAGE SYSTEM USING CLOUD BASED RANKS AS REPLICA STORAGE

BACKGROUND

Storage networks, such as storage area networks (SANs), are used to interconnect different types of data storage systems with different types of servers (also referred to herein as "host systems"). Some servers involve various hardware such as data storage media, storage controllers, memories, and the accompanying power systems, cooling systems, etc.

Storage controllers control access to data storage media and memories in response to read and write requests. The storage controllers may direct the data in accordance with data storage devices such as RAID (redundant array of independent disks), JBOD (just a bunch of disks), and other redundancy and security levels. As an example, an IBM® ESS (Enterprise Storage Server) such as a DS8000 series has redundant clusters of computer entities, cache, non-volatile storage, etc.

SUMMARY

Aspects of the disclosure may include a computer implemented method, computer program product, computing device, and system for using cloud based ranks as replica storage. An example method comprises allocating storage space on one or more cloud storage devices via a cloud interface; mapping the allocated storage space on the one or more cloud storage devices to corresponding virtual local addresses; grouping the virtual local addresses to create at least one cloud based rank from the allocated storage space on the one or more cloud storage devices; designating one or more of the at least one cloud based rank as cloud based replica storage for a corresponding primary storage; assigning a service level to the cloud based replica storage based, at least in part, on one or more characteristics of data being mirrored to the cloud based replica storage and a rate at which the data is mirrored to the cloud based replica storage; and dynamically adjusting the service level assigned to the cloud based replica storage in response to a command to swap the cloud based replica storage with the corresponding primary storage.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
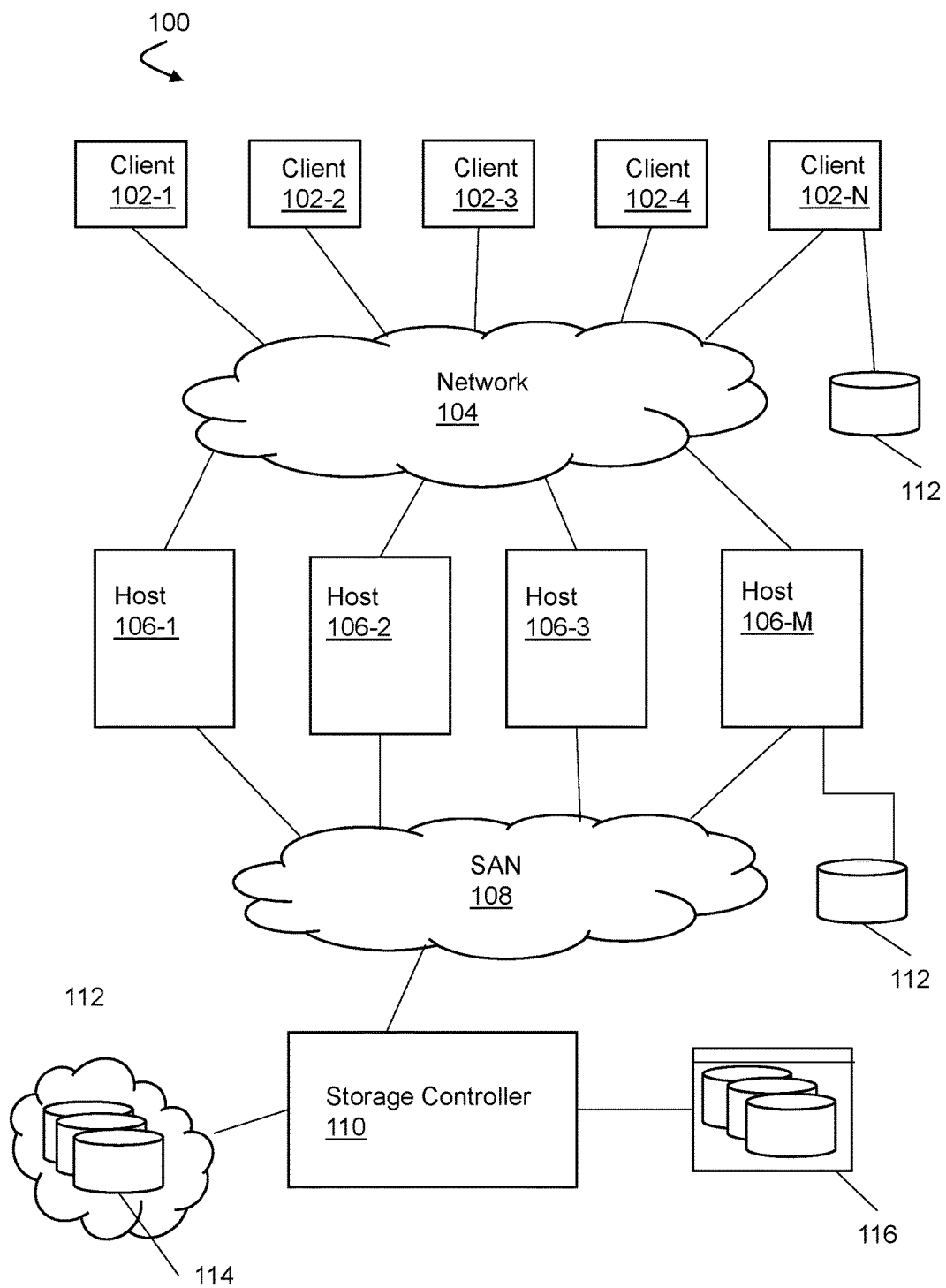
FIG. 1 is a high-level block diagram depicting one embodiment of an example network environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

FIG. 1 is a high-level block diagram depicting one embodiment of an example network architecture 100. The network architecture 100 is presented only by way of example and not limitation. Indeed, the systems and methods disclosed herein may be applicable to a wide variety of different network architectures in addition to the network architecture 100 shown in FIG. 1.

As shown, the network architecture 100 includes one or more clients or client computers 102-1 . . . 102-N, where N is the total number of client computers, and one or more hosts 106-1 . . . 106-M, where M is the total number of hosts (also referred to herein as "server computers" 106, "host systems" 106, or "host devices" 106). It is to be understood that although five clients 102 are shown in FIG. 1, other numbers of clients 102 can be used in other embodiments. For example, in some embodiments only one client 102 is implemented. In other embodiments, more than five or fewer than 5 clients 102 are used. Similarly, it is to be understood that although four hosts 106 are shown in FIG. 1, any suitable number of hosts 106 can be used. For example, in some embodiments, only a single host 106 is used. In other embodiments, more than four or fewer than four storage hosts 106 can be used.

Each of the client computers 102 can be implemented as a desktop computer, portable computer, laptop or notebook computer, netbook, tablet computer, pocket computer, smart phone, or any other suitable type of electronic device. Similarly, each of the hosts 106 can be implemented using any suitable host computer or server. Such servers can include, but are not limited to, IBM System z® and IBM System i® servers, as well as UNIX servers, Microsoft Windows servers, and Linux platforms.

The client computers 102 are communicatively coupled to hosts 106 via a network 104. The network 104 may include, for example, a local-area-network (LAN), a wide-area-network (WAN), the Internet, an intranet, or the like. In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). In the example shown in FIG. 1, the network 108 connects the servers 106 to one or more storage sub-systems 110. Although only one storage sub-system 110 is shown for purposes of illustration, it is to be understood that more than one storage sub-system 110 can be used in other embodiments. The storage sub-system 110 manages connections to arrays of storage devices 116. The arrays of storage devices 116 can include arrays of hard-disk drives and/or solid-state drives. In addition, in the example shown in FIG. 1, the storage sub-system 110 is configured to connect to and create storage arrays from cloud storage such that the cloud storage appears as a local storage array, as described in more detail below. By enabling the remote cloud storage to appear as a local storage array for the storage sub-system 110, the embodiments described herein are able to use the remote cloud storage as secondary and/or tertiary storage for a corresponding primary storage as well as perform swaps where the secondary or tertiary storage becomes primary storage and the primary storage becomes secondary or tertiary storage, as described in more detail below.

To access a storage sub-system 110, a host system 106 may communicate over physical connections from one or more ports on the host 106 to one or more ports on the storage sub-system 110. A connection may be through a switch, fabric, direct connection, or the like. In certain embodiments, the servers 106 and storage sub-systems 110 may communicate using a networking standard such as Fibre Channel (FC) or iSCSI.

Figure 2:
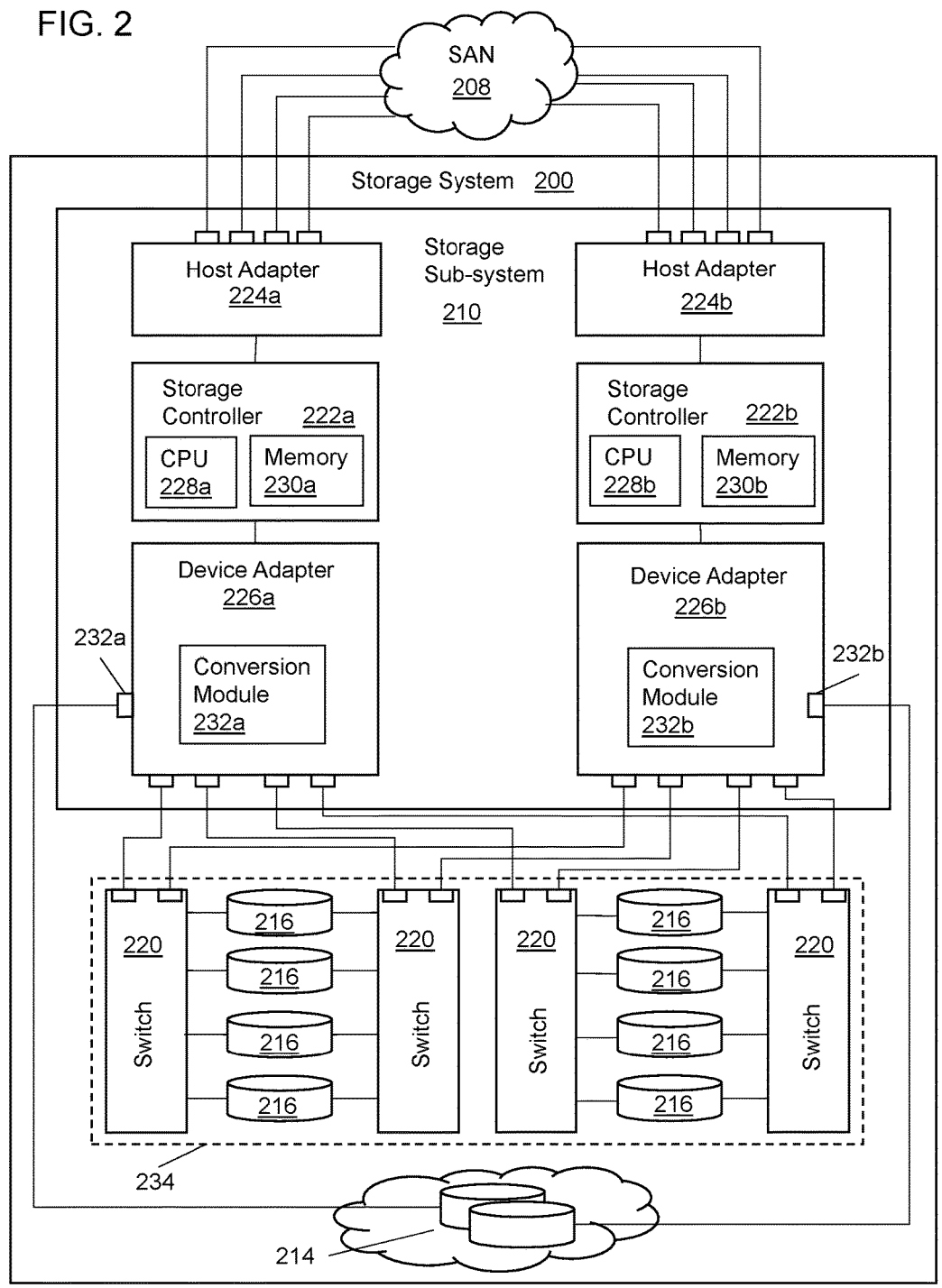
FIG. 2 is a high-level block diagram depicting one embodiment of an example storage system.

FIG. 2 is a high-level block diagram of one embodiment of a storage system 200. Storage system 200 includes one or more arrays of storage drives (e.g., hard-disk drives and/or solid-state drives). As shown, the storage system 200 includes a storage sub-system 210, a plurality of switches 202, and a plurality of storage drives 216 such as hard disk drives and/or solid-state drives (such as flash-memory-based drives). The storage sub-system 210 may enable one or more hosts (e.g., open system and/or mainframe servers) to access data in the plurality of storage drives 216.

In some embodiments, the storage sub-system 210 includes one or more storage controllers 222. In the example shown in FIG. 2, the storage sub-system includes storage controller 222a and storage controller 222b. Although only two storage controllers 226 are shown herein for purposes of explanation, it is to be understood that more than two storage controllers can be used in other embodiments. The storage sub-system 210 in FIG. 2 also includes host adapters 224a, 224b and device adapters 226a, 226b to connect the storage sub-system 210 to host devices and storage drives 204, respectively. Multiple storage controllers 222a, 222b provide redundancy to help ensure that data is available to connected hosts. Thus, when one storage controller (e.g. storage controller 222a) fails, the other storage controller (e.g. 222b) can pick up the I/O load of the failed storage controller to ensure that I/O is able to continue between the hosts and the storage drives 204. This process can be referred to as a "failover."

Each storage controller 222 can include respective one or more processors 228 and memory 230. The memory 230 can include volatile memory (e.g., RAM) as well as non-volatile memory (e.g., ROM, EPROM, EEPROM, flash memory, etc.). The volatile and non-volatile memory can store software modules that run on the processor(s) 228 and are used to access data in the storage drives 204. The storage controllers 222 can host at least one instance of these software modules. These software modules can manage all read and write requests to logical volumes in the storage drives 204.

In particular, each storage controller 222 is communicatively coupled to the storage drives 204 via a respective device adapter 226. Each device adapter 226 is configured to manage Input/Output (I/O) accesses to the storage drives 216. For example, the device adapters 226 logically organize the storage drives 216 and determine where to store data on the storage drives 216. The storage drives 216 (also referred to as disk drive modules (DDM)) can include groups of different types of drives having different performance characteristics. For example, the storage drives 216 can include a combination of (relatively) slow 'nearline' disks (e.g. 7,200 revolutions per minute (RPM) rotational speed), SAS disk drives (e.g. 10 k or 15 k RPM) and relatively fast solid state drives (SSD).

The device adapters 226 are coupled to the storage drives 216 via switches 220. Each of the switches 220 can be fiber switches coupling the storage drives 216 to the device adapters via fiber optic connections. The device adapters 226 logically group the storage drives 216 into array sites 234. For purposes of illustration, a single array site 234 comprised of storage drives 216 is depicted in FIG. 2. However, it is to be understood that more than one array site comprised of storage drives 216 can be included in other embodiments. The array site 234 can be formatted as a Redundant Array of Independent Disks (RAID) array 234. It is to be understood that any type of RAID array (e.g. RAID 0, RAID 5, RAID 10, etc.) can be used. Each RAID array is also referred to as a rank. Each rank is divided into a number of equally sized partitions referred to as extents. The size of each extent can vary based on the implementation. For example, the size of each extent can depend, at least in part, on the extent storage type. The extent storage type (e.g. Fixed Block (FB) or count key data (CKD)) is dependent on the type of host coupled to the storage sub-system (e.g. open-systems host or mainframe server). The extents are then grouped to make up logical volumes.

The storage sub-system 210 can enable various management features and functions, such as, but not limited to, full disk encryption, non-volatile storage (NVS) algorithms (e.g. thresholding, stage, destage), storage pool striping (rotate extents), dynamic volume expansion, dynamic data relocation, intelligent write caching, and adaptive multi-stream prefetching. One example of a storage system 210 having an architecture similar to that illustrated in FIG. 2 is the IBM DS8000™ series enterprise storage system. The DS8000™ is a high-performance, high-capacity storage sub-system providing disk and solid-state storage that is designed to support continuous operations. Nevertheless, the embodiments disclosed herein are not limited to the IBM DS8000™ series enterprise storage system, but can be implemented in any comparable or analogous storage system or group of storage systems, regardless of the manufacturer, product name, or components or component names associated with the system. Thus, the IBM DS8000™ is presented only by way of example and is not intended to be limiting.

Additionally, in the embodiment shown in FIG. 2, each of the device adapters 226 includes a respective network port 232, such as an Ethernet port, which communicatively couples the device adapter 226 to cloud storage devices 214 via a network, such as the internet. In the example shown in FIG. 2, each device adapter 226 further includes a respective conversion module 232 which is configured to allocate and group cloud storage devices 214 into virtual RAID arrays, such that the cloud storage devices 214 appear to the storage controllers 2226 as a local RAID array or rank. In this way, the features and functions of the storage controllers 226 that are available for local ranks, such as RAID array 234, are also available for the cloud rank 214.

As described in more detail below with respect to FIGS. 3 and 4, the conversion module 232 is configured to convert between storage controller commands and/or I/O accesses and cloud interface commands and/or I/O accesses. It is to be noted that although a conversion module 232 is included in the device adapters 226 in this example, the conversion module 232 can be included in storage controllers 222 in other embodiments. In particular, in some embodiments, each storage controller 222 includes a respective conversion module that does the conversion for commands to the respective device adapter 226.

Thus, the embodiments described herein enable advantages over conventional cloud storage systems. For example, conventional cloud storage systems typically enable relatively basic functionality, such as remote archiving, backup, and retrieval. However, such conventional systems are unable to perform advanced management functions on the data stored in the cloud, such as the management functions mentioned above (e.g. NVS algorithms such as thresholding, stage, and destage). Thus, through the use of the conversion module 232, discussed in more detail below, the embodiments described herein enable the performance of advanced management features on data stored on cloud storage devices which is not available for conventional cloud storage systems. In particular, through the use of the conversion module 232, the storage controllers 222 and device adapters 226 are able to access and utilize the virtual RAID arrays or ranks comprised of cloud storage as if the virtual RAID arrays were local drives coupled to the device adapters 226 rather than as remote storage. In this way, the same management features/functionality available for local drives, such as those mentioned above, are available for the remote cloud storage without modifying the underlying code and/or hardware associated with implementing those management features.

Furthermore, by creating virtual RAID arrays that appear as local storage to the storage sub-system 210, the embodiments described herein provide a solution to a problem of enabling the use of remote cloud storage as secondary/tertiary storage sites for continuous data mirroring and failover protection. Thus, the embodiments described herein do not use remote cloud storage simply as a remote backup, but rather enable the use of the remote cloud storage as secondary and/or tertiary mirror locations which can be utilized in a swap or failover operation to reduce interruption of service in the event that a primary storage location fails, as described in more detail below.

Figure 3:
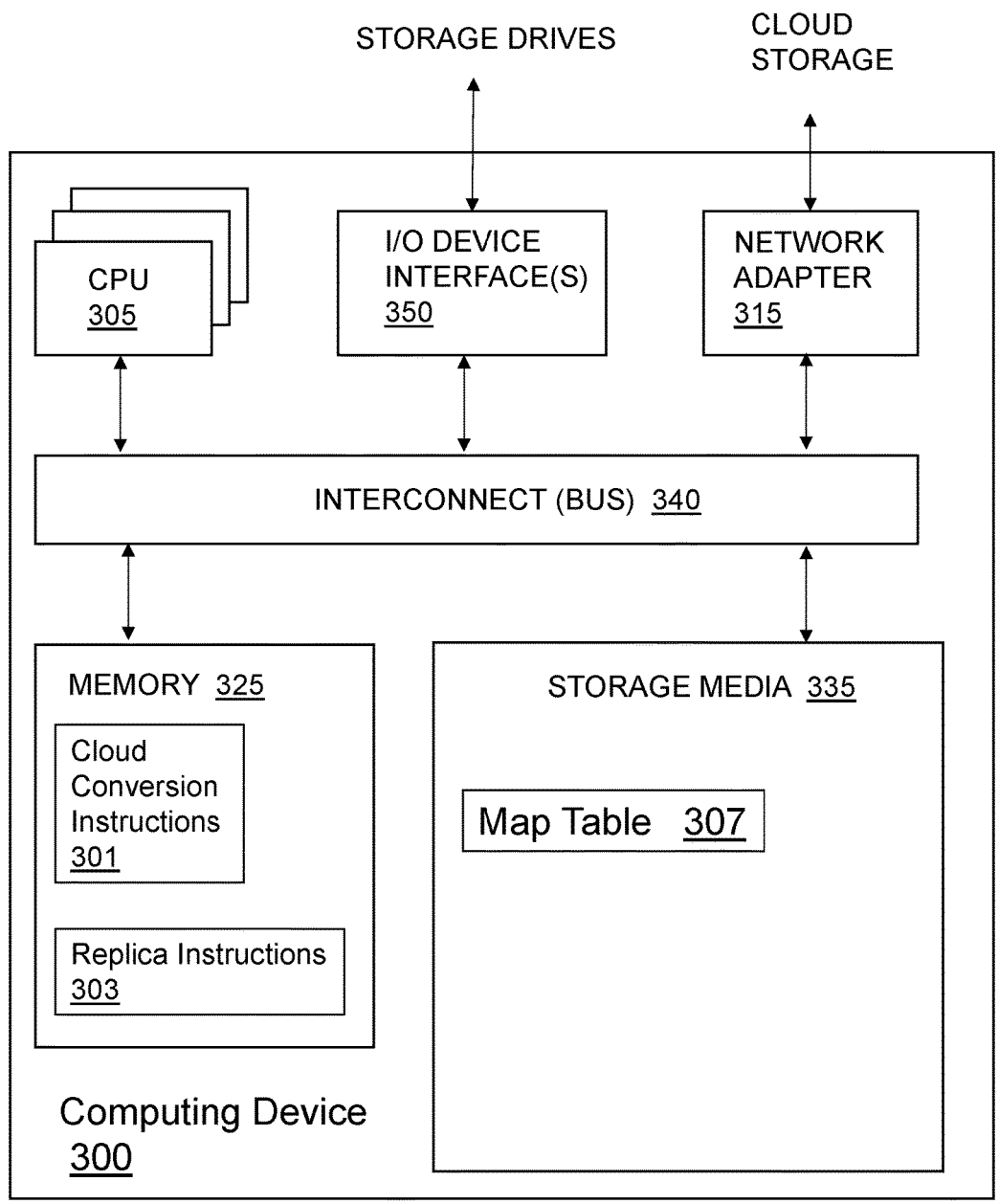
FIG. 3 is a block diagram of one embodiment of an example device adapter.

FIG. 3 is a block diagram of one embodiment of an example computing device 300 which can be implemented as a device adapter, such as device adapters 226 or a storage controller, such as storage controllers 222. For purposes of explanation, computing device 300 is described herein with respect to a device adapter. In the example shown in FIG. 3, the device adapter 300 includes a memory 325, storage 335, an interconnect (e.g., BUS) 340, one or more processors 305 (also referred to as CPU 305 herein), an I/O device interface 350, and a network adapter or port 315.

Each CPU 305 retrieves and executes programming instructions stored in the memory 325 and/or storage 335. The interconnect 340 is used to move data, such as programming instructions, between the CPU 305, I/O device interface 350, storage 335, network adapter 315, and memory 325. The interconnect 340 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 335 is generally included to be representative of a non-volatile memory, such as a hard disk drive, solid state device (SSD), removable memory cards, optical storage, or flash memory devices.

In some embodiments, the memory 325 stores cloud conversion instructions 301 and the storage 335 stores map table 307. However, in various embodiments, the cloud conversion instructions 301 and the map table 307 are stored partially in memory 325 and partially in storage 335, or they are stored entirely in memory 325 or entirely in storage 335.

When executed by the CPU 305, the cloud conversion instructions 301 cause the CPU 305 to utilize the map table 307 to implement the conversion module discussed above with respect to FIG. 2. It is to be noted that although the cloud conversion instructions 301 and map table 307 are depicted as being stored in and executed/utilized by a device adapter 300, in other embodiments the cloud conversion instructions 301 and map table 307 can be stored on and executed/utilized by a storage controller such as storage controller 222a and/or storage controller 222b shown in FIG. 2. The cloud conversion instructions 301 cause the CPU 305 to allocate space on cloud storage devices, such as cloud storage devices 214 depicted in FIG. 2. The space can be allocated statically or on demand as need arises. For example, the space can be allocated a priori or at run time. Furthermore, the cloud storage ranks can be created with different storage capacity.

The cloud conversion instructions 301 further cause the CPU 305 to group the allocated storage into one or more virtual ranks and to store a mapping between the cloud storage devices and the one or more virtual ranks in the map table 307. In particular, the cloud conversion instructions 301 cause the CPU 305 to generate the map table 307 which maps the allocated storage space to corresponding virtual local addresses and groups the virtual local addresses to create one or more virtual local ranks or RAID arrays. In this way, the virtual ranks of cloud storage appear as local direct attached ranks to a storage controller communicatively coupled to the device adapter 300 via the I/O device interfaces 350. The I/O device interfaces 350 also communicatively couple the device adapter 300 to local ranks of storage devices, such as solid state drives and nearline drives (e.g. storage drives 216 discussed above). For example, the I/O device interfaces 350 can include fiber optic ports. As used herein, a local rank is a rank or RAID array comprised of storage devices that are directly connected to the device adapter 300 without an intervening wide area network, such as the internet.

When an I/O access (e.g. a read or write request) is received, the cloud conversion instructions 301 cause the CPU 305 to determine if the request is directed to data stored on a virtual rank of cloud storage. When the request is directed to data stored on a virtual rank of cloud storage, the cloud conversion instructions 301 convert the I/O access for transmission to the cloud storage device via a cloud interface. For example, the cloud conversion instructions 301 can convert the I/O access using commands, format, device address, etc. used by the cloud interface to access the cloud storage devices. As used herein, the terms I/O access, read/write access, and data access can be used interchangeably. Exemplary cloud interfaces can include, but are not limited to, the IBM® Cloud Manager or the Amazon® Simple Storage Service (Amazon S3) interface. Thus, as discussed above, the cloud conversion instructions 301 transparently makes cloud storage available to a storage controller similar to other local storage devices.

In addition, the device adapter 300 includes replica instructions 303. It is to be understood that although replica instructions 303 and cloud conversion instructions 301 are depicted as separate in this example for purposes of explanation, cloud conversion instructions 301 and replica instructions 303 can be implemented as a single set of instructions, in other embodiments. Replica instructions 303 cause the CPU 305 to designate at least some of the one or more virtual ranks of cloud storage (also referred to herein as cloud based ranks and virtual local RAID arrays) as replica storage. As used herein, replica storage refers to secondary and tertiary storage volumes that continuously mirror or copy data writes to a corresponding primary storage and that can be used to replace the primary storage in event of a failure of the primary storage or maintenance. Thus, as used herein, cloud based replica storage refers to replica storage comprised of cloud based ranks.

In some embodiments, the replica instructions 303 cause the CPU 305 to utilize only cloud based ranks for the secondary storage and/or tertiary storage. In other embodiments, the replica instructions 303 cause the CPU 305 to designate one or more of the cloud based ranks as part of the secondary and/or tertiary storage and to designate one or more local ranks as part of the secondary and/or tertiary storage. Thus, in such embodiments, the secondary and/or tertiary storage comprises a mix of cloud based ranks and local ranks. In some such embodiments, the replica instructions 303 are configured to cause the CPU 305 to select whether to mirror data to the cloud based ranks or the local ranks based on a read frequency of the data being mirrored. For example, in some embodiments, the replica instructions 303 are configured to cause the CPU 305 to select the local ranks for mirroring data that has a read frequency above a predetermined threshold and to select the cloud based ranks for mirroring data that has a read frequency below the predetermined threshold. However, it is to be understood that other techniques can also be used to determine when to use the cloud based ranks and when to use the local ranks.

In addition, the replica instructions 303 are configured to cause the CPU 305 to assign a service level to the cloud based replica storage. For example, the service level can be assigned to a cloud based rank when it is designated as cloud based replica storage. In some embodiments, there are multiple levels of service which can be assigned to the cloud based replica storage. Various criteria can be used for determining the level of service. For example, in some embodiments, the level of service is based on one or more characteristics of the data being mirrored, a rate at which the data is mirrored to the cloud based replica storage (e.g. an input/output rate), as well as a service level agreement.

In some such embodiments, there are three levels of service. However, in other embodiments providing multiple levels of service, two or more than 3 levels of service can be provided. In this example, three levels of service are utilized and the selection of the level of service is based on the compressibility of the data being mirrored, a respective input/output data rate for the virtual local ranks designated as cloud based replica storage, and a service level agreement. For example, if a service level agreement indicates a low quality of service, the I/O data rate for the virtual local rank is below a threshold, and the data being accessed is compressible, then a first level of service is selected. A low quality of service can be any quality of service below a pre-defined threshold level of service. The first level of service is the lowest level of service from the three options in this example. For example, it can include higher latencies and lower throughput than the other two levels of service. If the service level agreement indicates a low quality of service, the I/O data rate for the virtual local rank is below a threshold, and the data is not compressible, then the second level of service is selected. The second level of service has greater throughput and/or less latency than the first level of service. The last or third level of service is used for all other data (e.g. the SLA indicates a level of service above the pre-defined threshold and/or the I/O data rate is above a threshold). The third level of service has greater throughput and/or less latency than both the first and second levels of service. Additional details regarding an example method of selecting a level of service for cloud based replica storage is described below with respect to FIG. 5.

By providing differing levels of service, the device adapter 326 is able to leverage the virtual ranks of cloud storage to provide greater flexibility in meeting the customer needs for data storage and access. It is to be noted that although the example first, second, and third levels are described as differing in latency and throughput, other factors can be used to differentiate the levels of service. For example, in some embodiments, the three levels of service have the same latency and throughput, but differ in cost and redundancy level.

Figure 4:
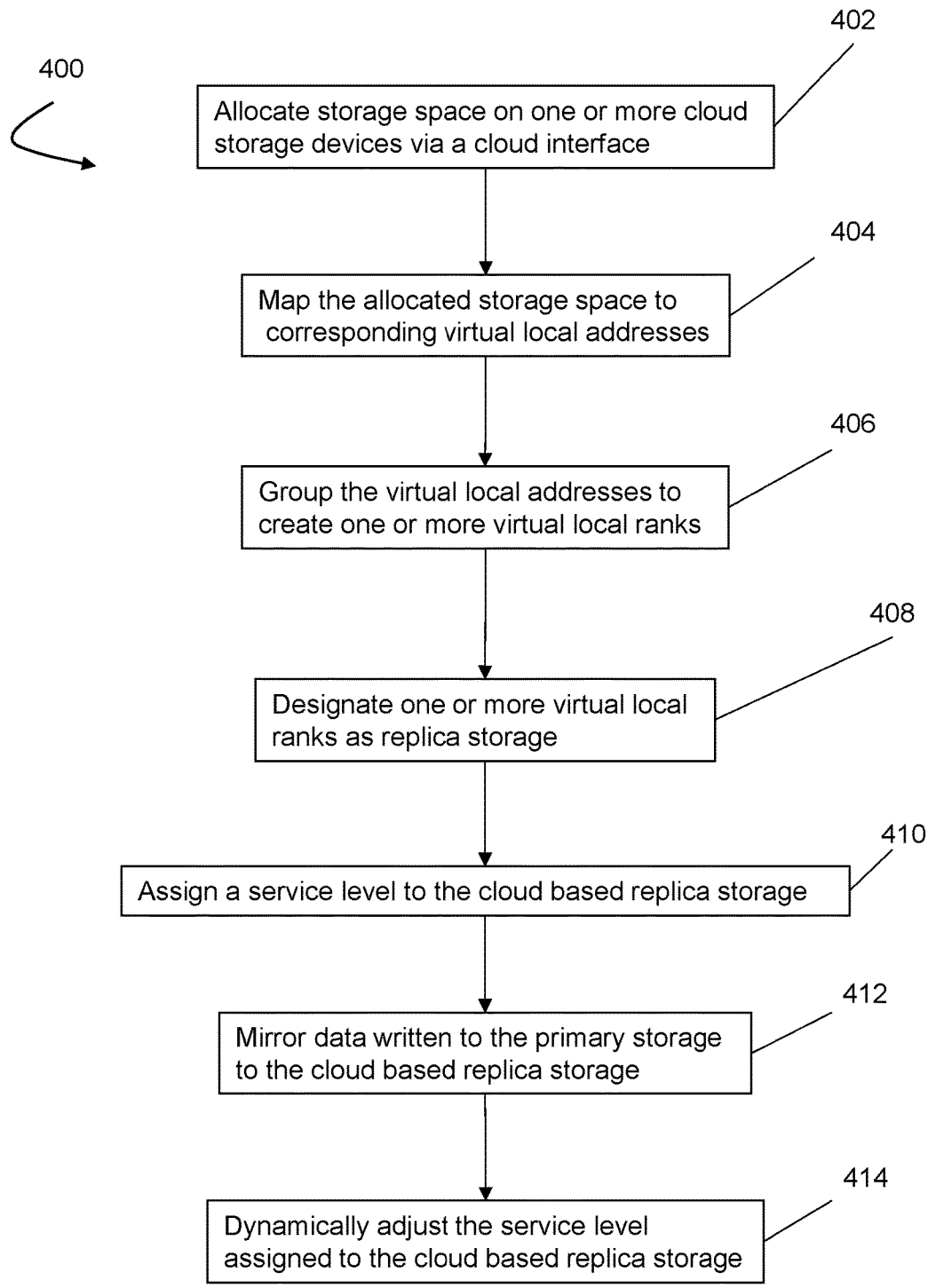
FIG. 4 is a flow chart depicting one embodiment of an example method of using cloud based ranks as replica storage.

FIG. 4 is a flow chart depicting one embodiment of a method 400 of using cloud based ranks as replica storage. The method 400 can be implemented by a device adapter, such as device adapters 226, or a storage controller, such as storage controllers 222. For example, the method 400 can be implemented by a CPU, such as CPU 305 in computing device 300, executing instructions, such as cloud conversion instructions 301 and replica instructions 303. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, storage space on one or more cloud storage devices is allocated via a cloud interface. A cloud interface is an interface configured to enable access to the cloud storage devices. For example, the cloud interface can be implemented as an application programming interface (API). Example cloud interfaces are discussed above. Allocating the cloud storage can include requesting via the cloud interface a specified amount of storage. This storage space can be requested statically before needed or dynamically as storage space is needed. Additionally, as used herein, cloud storage devices are storage devices accessed via a wide area network, such as the internet, as opposed to a local area network or direct communication link.

At block 404, the allocated storage space is mapped to corresponding virtual local addresses. For example, in some embodiments, the device adapter or storage controller assigns the allocated storage space to corresponding virtual local addresses. As used herein, a virtual local address is a memory address which appears as an address of a storage device coupled to the device adapter via a local connection. A local connection refers to a connection that is not over a wide area network or remote network, such as the internet.

At block 406, the virtual local addresses corresponding to the allocated storage space on the one or more cloud storage devices are grouped or organized to create one or more virtual local ranks (e.g. RAID arrays). That is, the virtual local addresses are arranged so that they appear to be directly connected to the device adapter as a local RAID array of storage devices.

At block 408, the one or more virtual local ranks are designated as replica storage for a corresponding primary storage. Thus, the one or more virtual local ranks (also referred to herein as cloud based ranks) are designated as secondary or tertiary storage. As discussed above, in some embodiments, only cloud based ranks are designated as secondary and/or tertiary storage. In other embodiments, a mix of cloud based ranks and local ranks are designated as secondary and/or tertiary storage. In such embodiments, a device adapter or storage controller can determine when to mirror data to the cloud based ranks and when to mirror data to the local ranks. In some embodiments, the determination is based on how frequently the data being mirrored is read. For example, in some such embodiments, the device adapter or storage controller selects a local rank for data that has a read frequency above a read threshold and selects a cloud based rank for data that has a read frequency below the read threshold.

At block 410, a service level is assigned to the cloud based replica storage. In particular, the service level assigned to the cloud based replica storage is selected based, at least in part, on one or more characteristics of data being mirrored to the cloud based replica storage and a rate at which the data is mirrored to the cloud based replica storage, as described above. In some embodiments, the one or more characteristics of the data being mirrored is the compressibility of the data. Further details regarding one embodiment selecting a service level for cloud based replica storage is described below with respect to FIG. 5.

At block 412, data written to the primary storage is mirrored to the cloud based replica storage. As used herein, local data access requests are requests using the virtual local addresses and formatted according to requirements of the device adapter for accessing local RAID arrays directly coupled to the device adapter. Similarly, cloud data access requests are data access requests configured according to requirements of the cloud interface and using addresses for the cloud storage devices. The data access requests can include read and write requests as well as various management features, such as thresholding, data encryption, etc. Thus, to mirror the data to the cloud based replica storage, local data write requests for copying the data to the one or more virtual local ranks designated as cloud based replica storage are converted to cloud data write requests configured according to the cloud interface (e.g. configured according to requirements of the API of the cloud interface). The converted cloud data write requests are communicated to the one or more cloud storage devices designated as cloud based replica storage via the cloud interface and a network port of the device adapter.

At block 414, the service level assigned to the cloud based replica storage is dynamically adjusted by the device adapter or storage controller in response to a command to swap the cloud based replica storage with the corresponding primary storage. As used herein, swapping the cloud based replica storage with the corresponding primary storage refers to a procedure to make the replica storage the primary storage and make the primary storage the replica storage. For example, in the event of a failure of the primary storage, a failover operation can swap the primary and secondary or primary and tertiary storage. Similarly, in order to perform maintenance on the primary storage, the primary storage can be swapped with the secondary or tertiary storage. In this way, service interruptions due to the failure or maintenance are reduced or eliminated. In response to the swap command, the device adapter or storage controller dynamically adjusts the service level of the cloud based replica storage to meet the demands of being designated primary storage. The dynamic adjustment is not dependent on the same factors as used for the initial service level assignment. For example, in some embodiments, the service level is set to the highest service level irrespective of the compressibility of the data, the service level agreement, and/or the rate at which data is mirrored to the cloud based replica storage. In this way, the service provided can better meet the demands of the primary storage.

Figure 5:
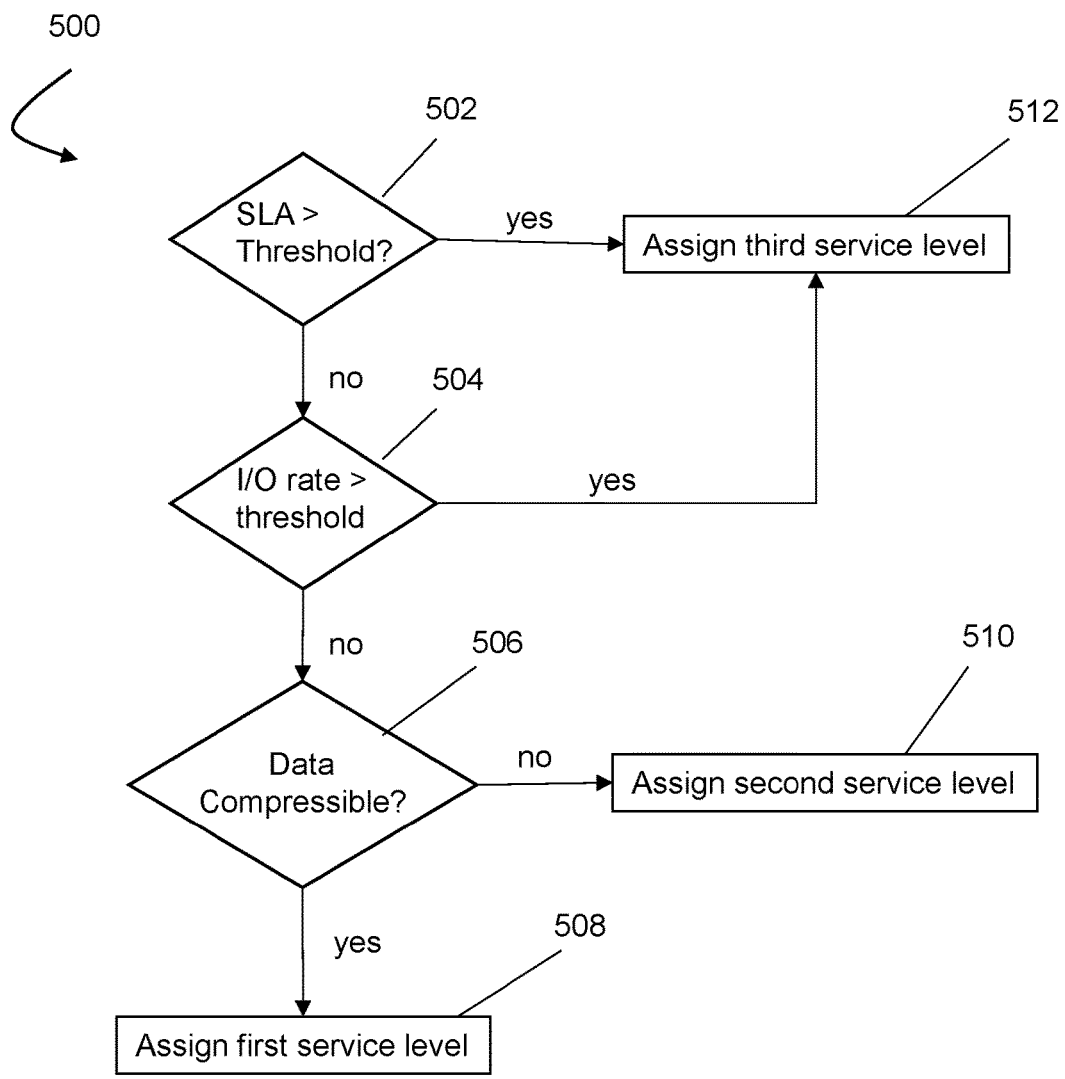
FIG. 5 is a flow chart depicting one embodiment of an example method of selecting a service level for cloud based replica storage.

FIG. 5 is a flow chart of one embodiment of an example method 500 of selecting a service level for cloud based replica storage. Method 500 can be implemented by a device adapter, such as device adapters 226, or a storage controller, such as storage controllers 222. For example, the method 500 can be implemented by a CPU, such as CPU 305 in computing device 300, executing instructions, such as replica instructions 303. It is to be understood that the order of actions in example method 500 is provided for purposes of explanation and that the method can be performed in a different order in other embodiments. Similarly, it is to be understood that some actions can be omitted or additional actions can be included in other embodiments. Method 500 can be implemented as part of operation 410 of method 400 described above.

At block 502, it is determined if the service level agreement (SLA) with a customer indicates a service level above a pre-defined service threshold. For example, in some embodiments, multiple levels of service can be defined, such as low quality of service (QoS), medium QoS, and high QoS. Each service level can have different characteristics, such as, but not limited to, throughput, latency, redundancy, cost, etc. In some embodiments, the threshold is set such that an SLA indicating a high QoS exceeds the threshold and an SLA indicating a low QoS or medium QoS is below the threshold.

In response to determining, at block 502, that the SLA indicates a QoS below the threshold, the device adapter or storage controller determines, at block 504, if the input/output (I/O) rate of the cloud based replica storage (e.g. the rate at which data is mirrored to the cloud based replica storage) is above a pre-defined I/O rate threshold. For example, in some embodiments, the threshold is set to 1 Gigabit per second (GB/s). In other embodiments, other I/O rate thresholds are used.

In response to determining, at block 504, that the I/O rate does not exceed the threshold, the device adapter or storage controller determines, at block 506, if the data being mirrored is compressible. For example, in some embodiments, if the amount of reduction achieved by compressing the data is less than a pre-determined percentage, then the data is not compressible. If the amount of reduction achieved by compressing the data is greater than the pre-determined percentage, then the data is compressible. In some embodiments, the pre-determined percentage is 25%. In other embodiments, other reduction percentages are used to determine if the data is compressible. If it is determined, at block 506, that the data is compressible, then the device adapter or storage controller assigns a first level of service to the cloud based replica storage, at block 508. As described above, the first level of service is the lowest level of service. For example, the first level of service can have the lowest throughput and/or highest latency, in some embodiments.

If it is determined, at block 506, that the data is not compressible, then the device adapter or storage controller assigns a second level of service to the cloud based replica storage at block 510. As discussed above, the second level of service can have higher throughput and/or lower latency than the first level of service, in some embodiments.

If it is determined, at block 502, that the SLA agreement indicates a level above the threshold (e.g. a high QoS), then the device adapter or storage controller assigns a third level of service to the cloud based replica storage at block 512. Similarly, if it is determined, at block 504, that the I/O rate is above the I/O rate threshold, then the device adapter or storage controller assigns the third level of service at block 512. As discussed above, the third level of service can have higher throughput and/or lower latency than the second level of service, in some embodiments. Additionally, although throughput and latency are used to differentiate the levels of service in this example, other characteristics can be used in other embodiments. For example, in some embodiments, the first level of service has lower redundancy than the second or third service levels. Additionally, in some embodiments, the service costs/fees can be different for the different service levels. For example, in some embodiments, the third service level has the highest recurring fee, but does not charge a fee for each retrieval, whereas the first and second levels have lower recurring fees, but charge differing fee amounts for retrieval of data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a computer-implemented method for utilizing cloud storage as replica storage. The method comprises allocating storage space on one or more cloud storage devices via a cloud interface; mapping the allocated storage space on the one or more cloud storage devices to corresponding virtual local addresses; grouping the virtual local addresses to create at least one cloud based rank from the allocated storage space on the one or more cloud storage devices; designating one or more of the at least one cloud based rank as cloud based replica storage for a corresponding primary storage; assigning a service level to the cloud based replica storage based, at least in part, on one or more characteristics of data being mirrored to the cloud based replica storage and a rate at which the data is mirrored to the cloud based replica storage; and dynamically adjusting the service level assigned to the cloud based replica storage in response to a command to swap the cloud based replica storage with the corresponding primary storage.

Example 2 includes the computer-implemented method of example 1, wherein assigning the service level to the cloud based replica storage comprises assigning a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold; assigning a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and assigning a third service level to the cloud based replica storage in response to determining that a service level agreement indicates a quality of service above the first pre-defined threshold or the rate at which data is mirrored to the cloud based replica storage is above the second pre-defined threshold.

Example 3 includes the computer-implemented method of any of examples 1-2, wherein dynamically adjusting the service level assigned to the cloud based replica storage comprises assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

Example 4 includes the computer-implemented method of any of examples 1-3, wherein designating one or more of the at least one cloud based rank as the cloud based replica storage for the corresponding primary storage comprises designating the at least one cloud based replica storage as secondary storage or tertiary storage for the corresponding primary storage.

Example 5 includes the computer-implemented method of any of examples 1-4, wherein the one or more of the at least one cloud based rank designated as the cloud based replica storage comprises part of secondary storage for the corresponding primary storage; wherein the secondary storage further comprises at least one local rank; and wherein the method further comprises selecting between the at least one local rank and the one or more cloud based ranks for mirroring data written to the primary storage based on how frequently the mirrored data is read.

Example 6 includes the computer-implemented method of example 5, wherein selecting between the at least one local rank and the one or more cloud based ranks comprises selecting the at least one local rank for data having a read frequency above a read threshold and selecting the one or more cloud based ranks for data having a read frequency below the read threshold.

Example 7 includes the computer-implemented method of any of examples 1-6, wherein the one or more of the at least one cloud based rank designated as the cloud based replica storage comprises all of secondary storage for the corresponding primary storage.

Example 8 includes a storage system. The storage system comprises a host adapter having one or more ports configured to communicatively couple the host adapter to one or more host devices; a storage controller comprising a processor and a memory, the storage controller communicatively coupled to the host adapter; and a device adapter comprising a processor and a memory, the device adapter communicatively coupled to the storage controller. The device adapter further comprises a plurality of ports communicatively coupled to a plurality of local storage drives and at least one network port communicatively coupled to a plurality of cloud storage devices via a network. One of the device adapter and the storage controller is further configured implement a conversion module configured to allocate storage space on one or more of the plurality of cloud storage devices; assign the allocated storage space to corresponding virtual local addresses; organize the allocated storage space into one or more virtual local redundant array of independent disks (RAID) arrays; designate the one or more virtual local RAID arrays as cloud based replica storage for a corresponding primary storage; assign a service level to the cloud based replica storage based, at least in part, on compressibility of data being mirrored to the cloud based replica storage and a rate at which the data is mirrored to the cloud based replica storage; and dynamically adjust the service level assigned to the cloud based replica storage in response to a command to swap the cloud based replica storage with the corresponding primary storage.

Example 9 includes the system of example 8, wherein the conversion module is configured to assign the service level to the cloud based replica storage by assigning a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold; assigning a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and assigning a third service level to the cloud based replica storage in response to determining that a service level agreement indicates a quality of service above the first pre-defined threshold or the rate at which data is mirrored to the cloud based replica storage is above the second pre-defined threshold.

Example 10 includes the system of any of examples 8-9, wherein the conversion module is configured to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

Example 11 includes the system of any of examples 8-10, wherein the conversion module is configured to designate the one or more virtual local RAID arrays as cloud based replica storage for the corresponding primary storage by designating the cloud based replica storage as secondary storage or tertiary storage for the corresponding primary storage.

Example 12 includes the system of any of examples 8-11, wherein the one or more virtual local RAID arrays designated as the cloud based replica storage comprises part of secondary storage for the corresponding primary storage. The secondary storage further comprises at least one local RAID array; and The storage controller is further configured to select between the at least one local RAID array and the one or more virtual local RAID arrays for mirroring data written to the primary storage based on how frequently the mirrored data is read.

Example 13 includes the system of example 12, wherein the storage controller is configured to select the at least one local RAID array for data having a read frequency above a read threshold and to select the one or more virtual local RAID arrays for data having a read frequency below the read threshold.

Example 14 includes a computer program product comprising a computer readable storage medium having a computer readable program stored therein. The computer readable program, when executed by a processor, causes the processor to allocate storage space on one or more cloud storage devices via a cloud interface; map the allocated storage space to corresponding virtual local addresses; group the virtual local addresses to create one or more virtual local redundant array of independent disks (RAID) arrays from the allocated storage space on the one or more cloud storage devices; designate the one or more virtual local RAID arrays as cloud based replica storage for a corresponding primary storage; assign a service level to the cloud based replica storage based, at least in part, on one or more characteristics of data being mirrored to the cloud based replica storage and a rate at which the data is mirrored to the cloud based replica storage; and dynamically adjust the service level assigned to the cloud based replica storage in response to a command to swap the cloud based replica storage with the corresponding primary storage.

Example 15 includes the computer program product of example 14, wherein the computer readable program is further configured to cause the processor to assign a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold; assign a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and assign a third service level to the cloud based replica storage in response to determining that a service level agreement indicates a quality of service above the first pre-defined threshold or the rate at which data is mirrored to the cloud based replica storage is above the second pre-defined threshold.

Example 16 includes the computer program product of any of examples 14-15, wherein the computer readable program is further configured to cause the processor to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

Example 17 includes the computer program product of any of examples 14-16, wherein the computer readable program is further configured to cause the processor to designate the one or more virtual local RAID arrays as cloud based replica storage for the corresponding primary storage by designating the cloud based replica storage as secondary storage or tertiary storage for the corresponding primary storage.

Example 18 includes the computer program product of any of examples 14-17, wherein the one or more virtual local RAID arrays designated as the cloud based replica storage comprises part of secondary storage for the corresponding primary storage and the secondary storage further comprises at least one local RAID array. The computer readable program is further configured to cause the processor to select between the at least one local RAID array and the one or more virtual local RAID arrays for mirroring data written to the primary storage based on how frequently the mirrored data is read.

Example 19 includes the computer program product of example 18, wherein the computer readable program is further configured to cause the processor to select the at least one local RAID array for data having a read frequency above a read threshold and to select the one or more virtual local RAID arrays for data having a read frequency below the read threshold.

Example 20 includes a computing device. The computing device comprises a network adapter configured to communicatively couple the computing device to one or more cloud storage devices via a network; a storage medium configured to store data; and a processor communicatively coupled to the network adapter and to the storage medium. The processor is configured to allocate storage space on one or more cloud storage devices via an application programming interface (API) associated with the one or more cloud storage devices; generate a map table which maps the allocated storage space to corresponding virtual local addresses and groups the virtual local addresses to create one or more virtual local ranks from the allocated storage space on the one or more cloud storage devices, the map table stored on the storage medium; designate the one or more virtual local ranks as cloud based replica storage for a corresponding primary storage; assign a service level to the cloud based replica storage based, at least in part, on one or more characteristics of data being mirrored to the cloud based replica storage and a rate at which the data is mirrored to the cloud based replica storage; and dynamically adjust the service level assigned to the cloud based replica storage in response to a command to swap the cloud based replica storage with the corresponding primary storage.

Example 21 includes the computing device of example 20, wherein the processor is further configured to assign a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold; assign a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and assign a third service level to the cloud based replica storage in response to determining that a service level agreement indicates a quality of service above the first pre-defined threshold or the rate at which data is mirrored to the cloud based replica storage is above the second pre-defined threshold.

Example 22 includes the computing device of any of examples 20-21, wherein the processor is further configured to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

Example 23 includes the computing device of any of examples 20-22, wherein the processor is further configured to designate the one or more virtual local ranks as cloud based replica storage for the corresponding primary storage by designating the cloud based replica storage as secondary storage or tertiary storage for the corresponding primary storage.

Example 24 includes the computing device of any of examples 20-23, wherein the one or more virtual local ranks designated as the cloud based replica storage comprise part of secondary storage for the corresponding primary storage and the secondary storage further comprises at least one local rank. The processor is further configured to select between the at least one local RAID array and the one or more virtual local RAID arrays for mirroring data written to the primary storage based on how frequently the mirrored data is read.

Example 25 includes the computing device of example 24, wherein the processor is further configured to select the at least one local RAID array for data having a read frequency above a read threshold and to select the one or more virtual local RAID arrays for data having a read frequency below the read threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method for utilizing cloud storage as replica storage, the method comprising:
   allocating storage space on one or more cloud storage devices via a cloud interface;
   mapping the allocated storage space on the one or more cloud storage devices to corresponding virtual local addresses;
   grouping the virtual local addresses to create at least one cloud based rank from the allocated storage space on the one or more cloud storage devices;
   designating one or more of the at least one cloud based rank as cloud based replica storage for a corresponding primary storage;
   assigning a service level to the cloud based replica storage based, at least in part, on one or more characteristics of data being mirrored to the cloud based replica storage and a rate at which the data is mirrored to the cloud based replica storage; and dynamically adjusting the service level assigned to the cloud based replica storage in response to a command to swap the cloud based replica storage with the corresponding primary storage.

2. The computer-implemented method of claim 1, wherein assigning the service level to the cloud based replica storage comprises:
assigning a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold;
assigning a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and
assigning a third service level to the cloud based replica storage in response to determining that a service level agreement indicates a quality of service above the first pre-defined threshold or the rate at which data is mirrored to the cloud based replica storage is above the second pre-defined threshold.

3. The computer-implemented method of claim 1, wherein dynamically adjusting the service level assigned to the cloud based replica storage comprises assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

4. The computer-implemented method of claim 1, wherein designating one or more of the at least one cloud based rank as the cloud based replica storage for the corresponding primary storage comprises designating the at least one cloud based replica storage as secondary storage or tertiary storage for the corresponding primary storage.

5. The computer-implemented method of claim 1, wherein the one or more of the at least one cloud based rank designated as the cloud based replica storage comprises part of secondary storage for the corresponding primary storage;
wherein the secondary storage further comprises at least one local rank; and
wherein the method further comprises selecting between the at least one local rank and the one or more cloud based ranks for mirroring data written to the primary storage based on how frequently the mirrored data is read.

6. The computer-implemented method of claim 5, wherein selecting between the at least one local rank and the one or more cloud based ranks comprises selecting the at least one local rank for data having a read frequency above a read threshold and selecting the one or more cloud based ranks for data having a read frequency below the read threshold.

7. The computer-implemented method of claim 1, wherein the one or more of the at least one cloud based rank designated as the cloud based replica storage comprises all of secondary storage for the corresponding primary storage.

8. A storage system comprising:
a host adapter having one or more ports configured to communicatively couple the host adapter to one or more host devices;
a storage controller comprising a processor and a memory, the storage controller communicatively coupled to the host adapter; and
a device adapter comprising a processor and a memory, the device adapter communicatively coupled to the storage controller;
wherein the device adapter further comprises a plurality of ports communicatively coupled to a plurality of local storage drives and at least one network port communicatively coupled to a plurality of cloud storage devices via a network;
wherein one of the device adapter and the storage controller is further configured implement a conversion module configured to:
allocate storage space on one or more of the plurality of cloud storage devices;
assign the allocated storage space to corresponding virtual local addresses;
organize the allocated storage space into one or more virtual local redundant array of independent disks (RAID) arrays;
designate the one or more virtual local RAID arrays as cloud based replica storage for a corresponding primary storage;
assign a service level to the cloud based replica storage based, at least in part, on compressibility of data being mirrored to the cloud based replica storage and a rate at which the data is mirrored to the cloud based replica storage; and
dynamically adjust the service level assigned to the cloud based replica storage in response to a command to swap the cloud based replica storage with the corresponding primary storage.

9. The system of claim 8, wherein the conversion module is configured to assign the service level to the cloud based replica storage by:
assigning a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold;
assigning a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and
assigning a third service level to the cloud based replica storage in response to determining that a service level agreement indicates a quality of service above the first pre-defined threshold or the rate at which data is mirrored to the cloud based replica storage is above the second pre-defined threshold.

10. The system of claim 8, wherein the conversion module is configured to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

11. The system of claim 8, wherein the conversion module is configured to designate the one or more virtual local RAID arrays as cloud based replica storage for the corresponding primary storage by designating the cloud based replica storage as secondary storage or tertiary storage for the corresponding primary storage.

12. The system of claim 8, wherein the one or more virtual local RAID arrays designated as the cloud based replica storage comprises part of secondary storage for the corresponding primary storage;
   wherein the secondary storage further comprises at least one local RAID array; and
   wherein the storage controller is further configured to select between the at least one local RAID array and the one or more virtual local RAID arrays for mirroring data written to the primary storage based on how frequently the mirrored data is read.

13. The system of claim 12, wherein the storage controller is configured to select the at least one local RAID array for data having a read frequency above a read threshold and to select the one or more virtual local RAID arrays for data having a read frequency below the read threshold.

14. A computer program product comprising a computer readable storage medium having a computer readable program stored therein, wherein the computer readable program, when executed by a processor, causes the processor to:
   allocate storage space on one or more cloud storage devices via a cloud interface;
   map the allocated storage space to corresponding virtual local addresses;
   group the virtual local addresses to create one or more virtual local redundant array of independent disks (RAID) arrays from the allocated storage space on the one or more cloud storage devices;
   designate the one or more virtual local RAID arrays as cloud based replica storage for a corresponding primary storage;
   assign a service level to the cloud based replica storage based, at least in part, on one or more characteristics of data being mirrored to the cloud based replica storage and a rate at which the data is mirrored to the cloud based replica storage; and
   dynamically adjust the service level assigned to the cloud based replica storage in response to a command to swap the cloud based replica storage with the corresponding primary storage.

15. The computer program product of claim 14, wherein the computer readable program is further configured to cause the processor to:
   assign a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold;
   assign a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and
   assign a third service level to the cloud based replica storage in response to determining that a service level agreement indicates a quality of service above the first pre-defined threshold or the rate at which data is mirrored to the cloud based replica storage is above the second pre-defined threshold.

16. The computer program product of claim 14, wherein the computer readable program is further configured to cause the processor to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

17. The computer program product of claim 14, wherein the computer readable program is further configured to cause the processor to designate the one or more virtual local RAID arrays as cloud based replica storage for the corresponding primary storage by designating the cloud based replica storage as secondary storage or tertiary storage for the corresponding primary storage.

18. The computer program product of claim 14, wherein the one or more virtual local RAID arrays designated as the cloud based replica storage comprises part of secondary storage for the corresponding primary storage;
   wherein the secondary storage further comprises at least one local RAID array; and
   wherein the computer readable program is further configured to cause the processor to select between the at least one local RAID array and the one or more virtual local RAID arrays for mirroring data written to the primary storage based on how frequently the mirrored data is read.

19. The computer program product of claim 18, wherein the computer readable program is further configured to cause the processor to select the at least one local RAID array for data having a read frequency above a read threshold and to select the one or more virtual local RAID arrays for data having a read frequency below the read threshold.

20. A computing device comprising:
   a network adapter configured to communicatively couple the computing device to one or more cloud storage devices via a network;
   a storage medium configured to store data; and
   a processor communicatively coupled to the network adapter and to the storage medium, wherein the processor is configured to:
   allocate storage space on one or more cloud storage devices via an application programming interface (API) associated with the one or more cloud storage devices;
   generate a map table which maps the allocated storage space to corresponding virtual local addresses and groups the virtual local addresses to create one or more virtual local ranks from the allocated storage space on the one or more cloud storage devices, the map table stored on the storage medium;
   designate the one or more virtual local ranks as cloud based replica storage for a corresponding primary storage;
   assign a service level to the cloud based replica storage based, at least in part, on one or more characteristics of data being mirrored to the cloud based replica storage and a rate at which the data is mirrored to the cloud based replica storage; and dynamically adjust the service level assigned to the cloud based replica storage in response to a command to swap the cloud based replica storage with the corresponding primary storage.

21. The computing device of claim 20, wherein the processor is further configured to:
   assign a first service level to the cloud based replica storage in response to determining that a service level agreement indicates a quality of service below a first pre-defined threshold, the rate at which data is mirrored to the cloud based replica storage is below a second pre-defined threshold, and compressibility of the data being mirrored is above a third pre-defined threshold;
   assign a second service level to the cloud based replica storage in response to determining that the service level agreement indicates a quality of service below the first pre-defined threshold, the rate at which data is mirrored to the cloud based replica storage is below the second pre-defined threshold, and compressibility of the data being mirrored is below the third pre-defined threshold; and
   assign a third service level to the cloud based replica storage in response to determining that a service level agreement indicates a quality of service above the first pre-defined threshold or the rate at which data is mirrored to the cloud based replica storage is above the second pre-defined threshold.

22. The computing device of claim 20, wherein the processor is further configured to dynamically adjust the service level assigned to the cloud based replica storage by assigning a highest level of service to the cloud based replica storage, irrespective of the compressibility of the data being mirrored and irrespective of the rate at which the data is being mirrored to the cloud based replica storage, in response to the command to swap the cloud based replica storage with the corresponding primary storage.

23. The computing device of claim 20, wherein the processor is further configured to designate the one or more virtual local ranks as cloud based replica storage for the corresponding primary storage by designating the cloud based replica storage as secondary storage or tertiary storage for the corresponding primary storage.

24. The computing device of claim 20, wherein the one or more virtual local ranks designated as the cloud based replica storage comprise part of secondary storage for the corresponding primary storage;
   wherein the secondary storage further comprises at least one local rank; and
   wherein the processor is further configured to select between the at least one local RAID array and the one or more virtual local RAID arrays for mirroring data written to the primary storage based on how frequently the mirrored data is read.

25. The computing device of claim 24, wherein the processor is further configured to select the at least one local RAID array for data having a read frequency above a read threshold and to select the one or more virtual local RAID arrays for data having a read frequency below the read threshold.

* * * * *